(12) United States Patent
Commaret et al.

(10) Patent No.: US 7,707,832 B2
(45) Date of Patent: May 4, 2010

(54) DEVICE FOR INJECTING A MIXTURE OF AIR AND FUEL, AND A COMBUSTION CHAMBER AND TURBOMACHINE PROVIDED WITH SUCH A DEVICE

(75) Inventors: Patrice Andre Commaret, Rubelles (FR); Denis Jean Maurice Sandelis, Nangis (FR); Denis Gabriel Trahot, Herblay (FR)

(73) Assignee: SNECMA, Paris (FR)

( * ) Notice: Subject to any disclaimer, the term of this patent is extended or adjusted under 35 U.S.C. 154(b) by 641 days.

(21) Appl. No.: 11/566,330

(22) Filed: Dec. 4, 2006

(65) Prior Publication Data

US 2007/0125085 A1 Jun. 7, 2007

(30) Foreign Application Priority Data

Dec. 5, 2005 (FR) .................................. 05 12293

(51) Int. Cl.
*F02C 1/00* (2006.01)
*F02G 3/00* (2006.01)
(52) U.S. Cl. ............................... 60/737; 60/738; 60/748
(58) Field of Classification Search .................. 60/748, 60/737, 738
See application file for complete search history.

(56) References Cited

U.S. PATENT DOCUMENTS

| 4,726,192 | A | * | 2/1988 | Willis et al. ..................... 60/737 |
| 4,870,818 | A | | 10/1989 | Suliga |
| 5,894,732 | A | | 4/1999 | Kwan |
| 6,035,645 | A | * | 3/2000 | Bensaadi et al. ............... 60/742 |
| 2003/0131600 | A1 | | 7/2003 | David et al. |
| 2005/0039458 | A1* | | 2/2005 | Leen et al. ..................... 60/748 |

FOREIGN PATENT DOCUMENTS

| EP | 1 096 206 A1 | 5/2001 |
| EP | 1 258 681 A2 | 11/2002 |
| FR | 2 753 779 | 3/1998 |

OTHER PUBLICATIONS

U.S. Appl. No. 12/190,105, filed Aug. 12, 2008, Commaret, et al.

* cited by examiner

*Primary Examiner*—Michael Cuff
*Assistant Examiner*—Craig Kim
(74) *Attorney, Agent, or Firm*—Oblon, Spivak, McClelland, Maier & Neustadt, L.L.P.

(57) ABSTRACT

A device for injecting a mixture of air and fuel into a combustion chamber of a turbomachine is disclosed. The injection device has symmetry of revolution about an axis and includes radial swirl inducers of outside diameter D2, a bowl spaced axially from the radial swirl inducers, and a support ring for supporting the injection device, which is arranged around the bowl. The bowl has a cylindrical wall extended by a flared wall, the flared wall being provided with air intake holes. The support ring includes a first cylindrical portion of outside diameter D3, connected to a second cylindrical portion of outside diameter D4 spaced axially from the first cylindrical portion, the first cylindrical portion being connected to the cylindrical wall of the bowl by a plurality of support tabs.

14 Claims, 4 Drawing Sheets

DEVICE FOR INJECTING A MIXTURE OF AIR AND FUEL, AND A COMBUSTION CHAMBER AND TURBOMACHINE PROVIDED WITH SUCH A DEVICE

BACKGROUND OF THE INVENTION AND DESCRIPTION OF THE PRIOR ART

The invention applies to the field of turbomachines and relates to a device for injecting a mixture of air and fuel into a combustion chamber of a turbomachine.

It relates more precisely to a novel type of assembly for an aerodynamic injection device.

In the remainder of the description, the terms "upstream" or "downstream" will be used to denote the positions of the structural elements in relation to one another in the axial direction, taking the gas flow direction as reference point. Likewise, the terms "internal" or "radially internal" and "external" or "radially external" will be used to denote the positions of the structural elements in relation to one another in the radial direction, taking the axis of rotation of the turbomachine as reference point.

A turbomachine comprises one or more compressors which deliver pressurized air to a combustion chamber, where the air is mixed with fuel and ignited so as to generate hot combustion gases. These gases flow downstream of the chamber toward one or more turbines, which convert the energy thus received in order to rotate the compressor or compressors and provide the work required, for example, to power an aircraft.

Typically, the combustion chambers used in aeronautics comprise an internal wall and an external wall interconnected at their upstream end by a chamber endwall. The chamber endwall has, spaced circumferentially, a plurality of openings each accommodating an injection device which allows the mixture of air and fuel to be fed into the chamber. Each injection device particularly comprises a fuel injector, radial swirl inducers, a venturi, a bowl and a deflector, which are interconnected, the chamber endwall being fastened to the deflector.

There are a number of combustion chamber types: "single-head" chambers, also referred to as "conventional" chambers, that is to say with a single circumferential row of injection devices, and "multi-head" chambers, that is to say with a plurality of circumferential rows of injection devices. Among the single-head chambers a distinction is drawn between chambers "with a reduced primary zone height" and conventional single-head chambers. The primary zone height corresponds to the distance between the internal wall and the external wall of the chamber, measured immediately downstream of the downstream end of a bowl.

In the case of a conventional single-head chamber, as illustrated in patent FR 2 753 779, the contact area between the bowl and the deflector generally forms a cylinder whose diameter is greater than the outside diameter of the swirl inducers.

In the following, as illustrated in FIG. 1, the reference D1 will denote the diameter of the cylinder corresponding to the contact area between the bowl and the deflector, and the reference D2 will denote the outside diameter of the swirl inducers.

In the case of a multi-head chamber or of a single-head chamber with a reduced primary zone height, the available space for the integration of the injection devices is smaller than for a conventional single-head chamber. The diameter D1 is therefore limited. However, it may be necessary with regard to some turbomachines to use "high-permeability" bowls in contrast to "conventional" bowls. The permeability is the capacity of an injection device to inject a certain air flow inside the bowl so as to create the desired mixture of air and fuel. High-permeability bowls are provided with swirl inducers whose inlet section is larger than in the case of conventional bowls. This leads to a larger axial bulk of the swirl inducers and also affects the radial bulk of the injection device which, for its part too, is larger than in the case of conventional bowls. The use of high-permeability bowls additionally requires that a sufficient supply of pressurized air is maintained at the air intake holes made in the bowl, downstream of the radial swirl inducers. In the case of a multi-head chamber or a single-head chamber with a reduced primary zone height, given that the diameter D1 is limited, the outside diameter D2 of the radial swirl inducers then becomes greater than D1, making it impossible to supply the air intake holes.

SUMMARY OF THE INVENTION

The invention makes it possible to solve this problem by providing an injection device comprising a high-permeability bowl, which can be integrated into multi-head or single-head chambers with a reduced primary zone height, this injection device still providing the same capabilities as an injection device provided with a conventional bowl, namely that it delivers a mixture of air and fuel having the same characteristics. The invention additionally makes it possible to obtain an injection device having a reduced bulk with respect to the traditional devices, resulting in a reduction in the mass, an objective which is always sought in aeronautics.

The object of the invention is therefore to succeed in creating a sufficient supply section for the air intake holes by virtue of a novel injection device which makes it possible to have a diameter for the swirl inducers that is greater than the diameter corresponding to the contact area between the deflector and the bowl.

More specifically, the invention relates to a device for injecting a mixture of air and fuel into a combustion chamber of a turbomachine, the injection device having symmetry of revolution about an axis and comprising, arranged from upstream to downstream in the gas flow direction, radial swirl inducers of outside diameter D2, a bowl spaced axially from the radial swirl inducers, and a support ring for supporting the injection device, which is arranged around the bowl, the bowl having a cylindrical wall extended by a flared wall, the flared wall being provided with air intake holes, in which injection device the support ring comprises, arranged from upstream to downstream in the gas flow direction, a first cylindrical portion of outsider diameter D3, connected to a second cylindrical portion of outside diameter D4 spaced axially from the first cylindrical portion, the first cylindrical portion being connected to the cylindrical wall of the bowl by a plurality of support tabs.

Advantageously, the diameter D3 is less than the diameter D2.

According to an exemplary embodiment, the support tabs are distributed circumferentially and uniformly around the bowl. Furthermore, since the consecutive air intake holes are connected by a residual wall, the support tabs may advantageously be arranged opposite the residual wall.

In the circumferential direction, the support tabs may have a thickness which is less than the thickness of the residual wall existing between two consecutive intake holes.

According to a possible embodiment, the diameter D3 is less than the diameter D4.

Advantageously, the second cylindrical portion of the support ring is provided with an annular radial protuberance directed toward the axis of the cylindrical part. This radial protuberance may be provided with cooling holes.

Furthermore, the invention also relates to a combustion chamber comprising an internal wall, an external wall and a chamber endwall and being provided with at least one such injection device.

The invention finally relates to a turbomachine provided with such a combustion chamber.

BRIEF DESCRIPTION OF THE DRAWINGS

The invention will be better understood, and other advantages thereof will become clearly apparent, in the light of the description of a preferred embodiment given by way of non-limiting example and with reference to the appended drawings, in which.

DESCRIPTION OF THE PREFERRED EMBODIMENTS

The same references will be retained throughout the description to denote parts or details which are similar from one figure to another.

Figure 1:
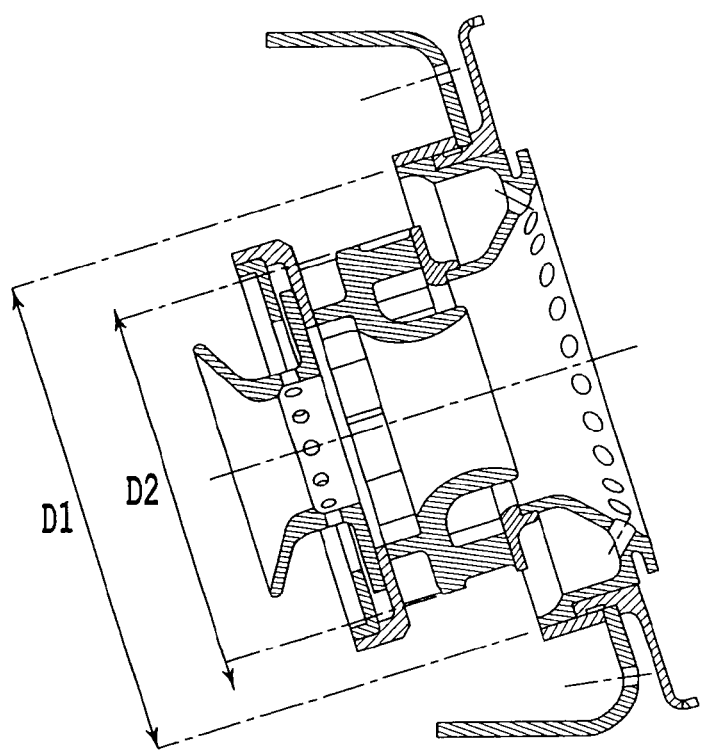
FIG. 1 is a schematic sectional view of an injection device according to the prior art.

FIG. 1 has been described above and shows a sectional view of an injection device according to the prior art.

Figure 2:
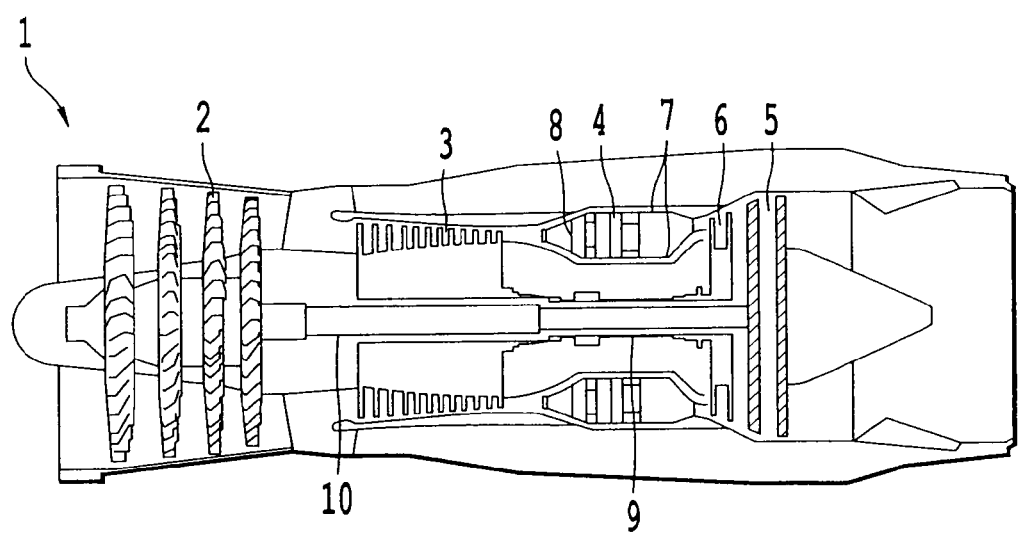
FIG. 2 is a schematic sectional view of a turbomachine and, more precisely, of an aircraft jet engine.

FIG. 2 shows in section an overall view of a turbomachine 1, for example an aircraft jet engine, comprising a low-pressure compressor 2, a high-pressure compressor 3, a combustion chamber 4, a low-pressure turbine 5 and a high-pressure turbine 6. The combustion chamber 4 may be of the annular type and is delimited by two annular walls 7 spaced radially with respect to the axis X of rotation of the jet engine and connected at their upstream end to an annular chamber endwall 8. The chamber endwall 8 has a plurality of openings (not shown) with a uniform circumferential spacing. In each of these openings is mounted an injection device. The combustion gases flow downstream into the combustion chamber 4 and then supply the turbines 5 and 6, which respectively drive the compressors 2 and 3, arranged upstream of the chamber endwall 8, via two respective shafts 9 and 10. The high-pressure compressor 3 supplies air to the injection devices and also to two annular spaces arranged radially inside and outside the combustion chamber 4, respectively. The air introduced into the combustion chamber 4 assists in vaporizing the fuel and in its combustion. The air circulating outside the walls of the combustion chamber 4 assists in cooling these walls and enters the chamber by way of dilution holes (not shown) in order to cool the combustion gases transmitted to the turbine.

Figure 3:
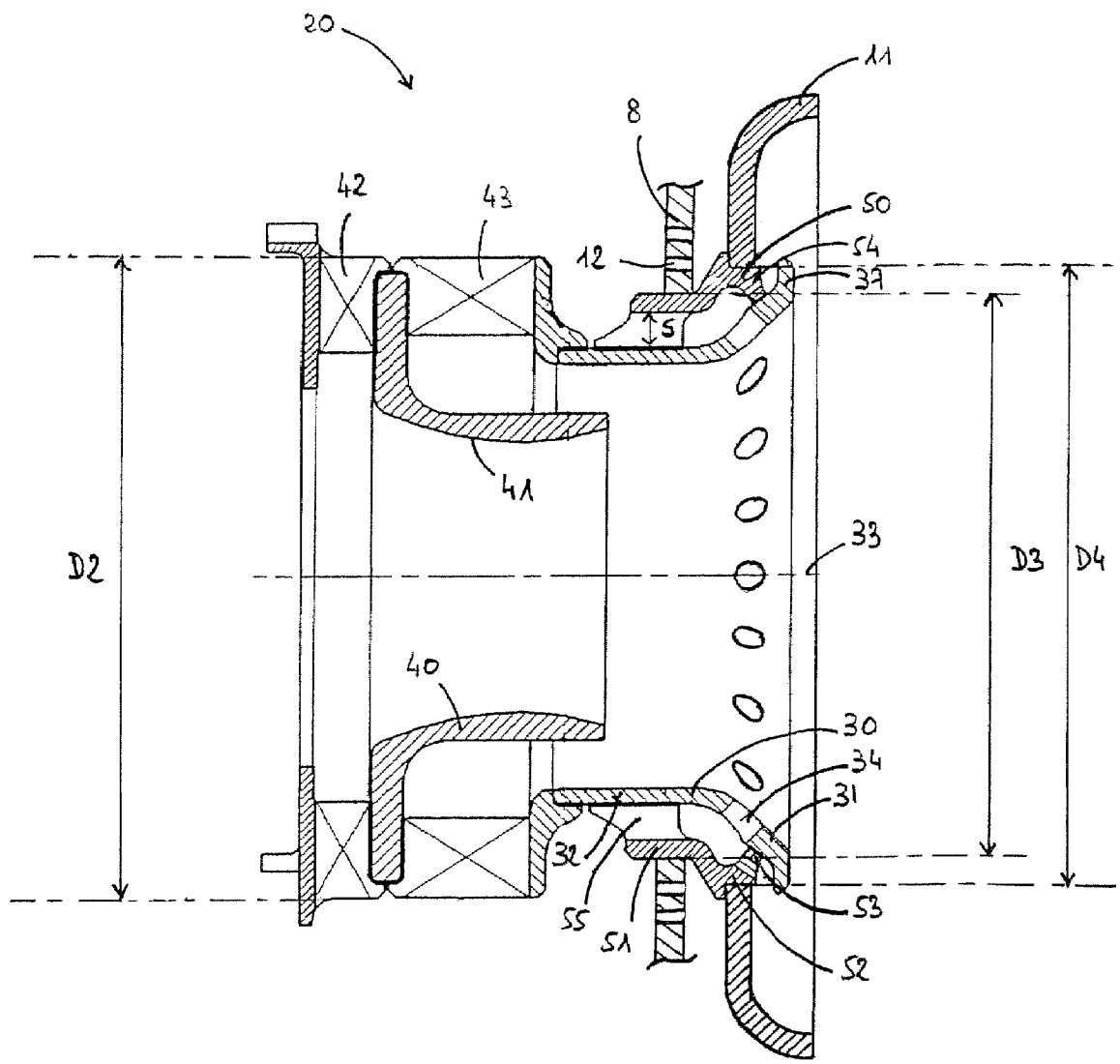
FIG. 3 is a schematic sectional view of an exemplary embodiment of an injection device according to the invention.

FIG. 3 shows in section an exemplary embodiment of an injection device 20 according to the invention. The injection device 20 particularly comprises a bowl 30, a venturi 40, two radial swirl inducers 42 and 43, a deflector 11 and a support ring 50 for supporting the injection device 20 in the chamber endwall 8. The deflector 11 is arranged in the combustion chamber parallel to the chamber endwall 8 and is cooled by impact with air passing through orifices 12 running through the chamber endwall 8. The bowl 30 is mounted inside the deflector 11 via the support ring 50. The bowl 30 has a wall 31 which is flared in the downstream direction, forming an extension of a cylindrical wall 32 arranged coaxially to the axis 33. The flared wall 31 has a plurality of air intake holes 34 supplied with air coming from the high-pressure compressor 3 via the annular section S, and also an annular flange 37. The flange 37, in this case integral with the flared wall 31, could equally well be formed on the support ring 50. The cylindrical wall 32 surrounds the venturi 40 of axis 33, the internal contour 41 of which has a convergent-divergent shape. The venturi 40 delimits the air flows emanating from the primary swirl inducer 42 and from the secondary swirl inducer 43. The assembly formed by the primary and secondary swirl inducers has an outside diameter D2.

The support ring 50 is composed of a first, upstream cylindrical portion 51, of axis 33 and of outside diameter D3, and of a second, downstream cylindrical portion 52, coaxial to the upstream cylindrical portion 51, of outside diameter D4, with D4 being greater than D3. The upstream 51 and downstream 52 cylindrical portions are interconnected by a conical intermediate wall so as to take up the gap between the diameters of the cylindrical portions 51 and 52.

Figure 4:
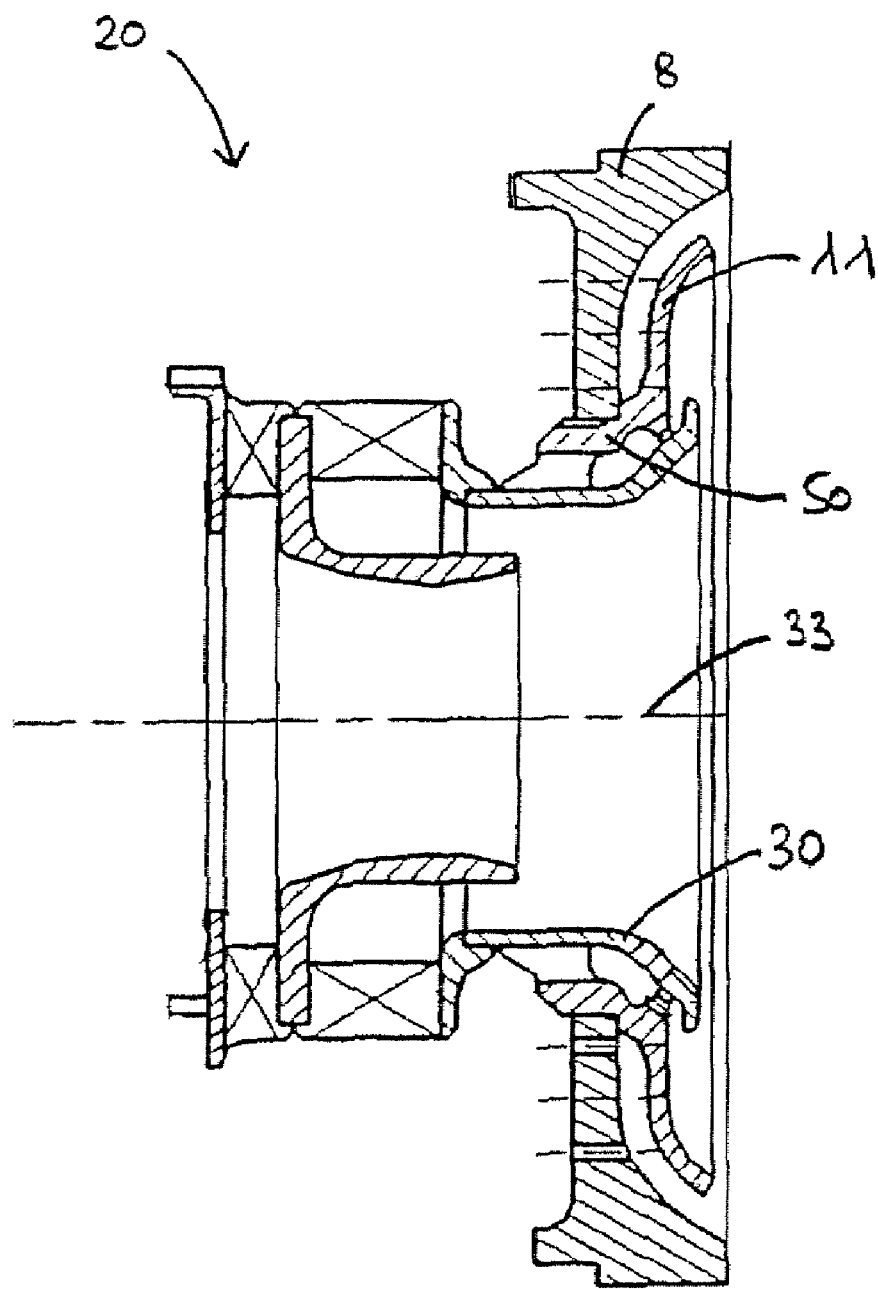
FIG. 4 is a schematic sectional view of another exemplary embodiment of an injection device according to the invention.

The downstream cylindrical portion 52 is provided, at its downstream end, with an annular radial protuberance 53 directed toward the axis 33. The radial protuberance 53 comes into contact with the flared wall 31 of the bowl such that the contact area is arranged downstream of the air intake holes 34. This protuberance is provided with cooling holes 54 whose job is to supply air from the high-pressure compressor 3 in order to cool the flange 37. The deflector 11 is mounted on the support ring 50 at the downstream cylindrical portion 52, the contact area between the deflector 11 and the support ring 50 being generally a cylinder of axis 33 and of diameter D4. In the example described here, the deflector 11 and the support ring 50 are two separate parts, but they could equally well form one and the same part, as illustrated in FIG. 4.

Figure 5:
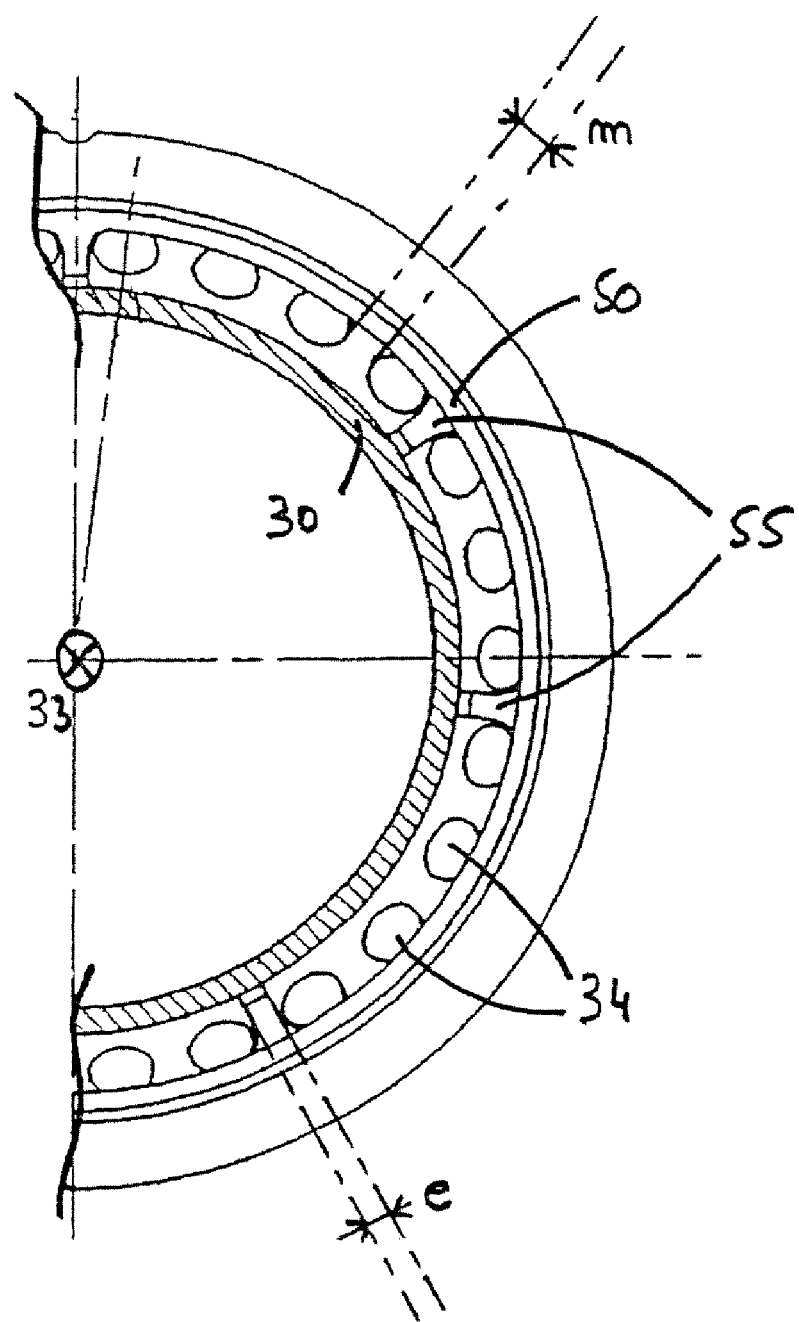
FIG. 5 is a partial side view of part of a device according to the invention, seen from the upstream direction.

The upstream cylindrical portion 51 of the support ring 50 is connected to the cylindrical wall 32 of the bowl 30 by a plurality of support tabs 55, which are distributed circumferentially in a uniform manner. The number of support tabs 55 may, for example, be from 5 to 8. As illustrated in FIG. 5, each tab is situated between the centerlines of two consecutive air intake holes 34, opposite the residual material existing between these two holes, so as not to block off any hole 34, not even partially. Their thickness e in the circumferential direction is less than the thickness m of residual material existing between two consecutive intake holes 34. A means for the angular indexing of the support ring 50 with respect to the intake holes 34 may be provided, for example using grooves machined in the external surface of the cylindrical wall 32 of the bowl 30. During the mounting operation, the support tabs 55 would then become housed in these grooves, thereby preventing the support ring 50 from being mounted with one or more of its support tabs 55 falling opposite one or more intake holes 34.

The support tabs 55 make it possible to form an annular flow section S between the support ring 50 and the cylindrical wall 32 of the bowl 30. They may be brazed onto the bowl 30.

The chamber endwall 8 is mounted on the upstream cylindrical portion 51 of the support ring 50. The contact area between these two parts is generally a cylinder of axis 33 and of diameter D3. This diameter D3 corresponds to the diameter D1 mentioned above. It is clear to see that, by virtue of the invention, an air flow section S between the support ring 50 and the bowl 30 can be formed while at the same time having a diameter D3 which is less than the outside diameter D2 of the swirl inducers 42 and 43. It is thus ensured that the intake holes 34 and the cooling holes 54 are supplied with air. Furthermore, the radial bulk of the injection device 20 is reduced, since the injection device 20 is mounted on the chamber endwall 8 over a smaller diameter D3. For example, where an injection device according to the prior art gives a value for D1 of around 55 to 60 mm, an injection device according to the invention makes it possible to obtain a value for D3 of around 40 to 50 mm, that is to say a saving of 10 to 15 mm in this example.

The invention claimed is:

1. A device for injecting a mixture of air and fuel into a combustion chamber of a turbomachine, the injection device having symmetry of revolution about an axis, comprising:

radial swirl inducers of outside diameter D2;

a bowl spaced axially downstream in a gas flow direction from the radial swirl inducers, the bowl including a cylindrical wall extended by a flared wall, the flared wall being provided with air intake holes; and a support ring configured to support the injection device, which support ring is arranged around the bowl, wherein the support ring comprises a first cylindrical portion of outside diameter D3, and a second cylindrical portion of outside diameter D4 spaced axially downstream in the gas flow direction from the first cylindrical portion, the first cylindrical portion being connected to the cylindrical wall of the bowl by a plurality of support tabs, and wherein an outer circumference of the first cylindrical portion of the support ring directly contacts a chamber endwall.

2. The injection device as claimed in claim 1, wherein the diameter D3 is less than the diameter D2.

3. The injection device as claimed in claim 1, wherein the support tabs are distributed circumferentially and uniformly around the bowl.

4. The injection device as claimed in claim 1, wherein the consecutive air intake holes are connected by a residual wall and wherein the support tabs are arranged opposite the residual wall.

5. The injection device as claimed in claim 1, wherein, in the circumferential direction, the support tabs include a thickness which is less than the thickness of the residual wall disposed between two consecutive air intake holes.

6. The injection device as claimed in claim 1, wherein the diameter D3 is less than the diameter D4.

7. The injection device as claimed in claim 1, wherein the second cylindrical portion of the support ring is provided with an annular radial protuberance directed toward the axis of the cylindrical portion.

8. The injection device as claimed in claim 7, wherein the radial protuberance is provided with cooling holes.

9. A combustion chamber comprising an internal wall, an external wall and a chamber endwall, which combustion chamber is provided with at least one injection device as claimed in claim 1.

10. A turbomachine provided with a combustion chamber as claimed in claim 9.

11. The injection device as claimed in claim 1, wherein an outer circumference of the second cylindrical portion of the support ring directly contacts a deflector.

12. The injection device as claimed in claim 1, wherein a deflector and support ring are integrally formed and the deflector extends radially outward from the second cylindrical portion of the support ring.

13. The injection device as claimed in claim 1, wherein the support ring is a single piece unit.

14. The injection device as claimed in claim 7, wherein the radial protuberance directly contacts an outer surface of the flared wall of the bowl.

* * * * *